United States Patent Office.

PAUL CASAMAJOR, OF BROOKLYN, NEW YORK; LOUISE JANE CASAMAJOR EXECUTRIX OF SAID PAUL CASAMAJOR, DECEASED.

PROCESS OF TREATING CINCHONA-BARK.

SPECIFICATION forming part of Letters Patent No. 378,231, dated February 21, 1888.

Application filed March 26, 1887. Serial No. 232,580. (No specimens.)

*To all whom it may concern:*

Be it known that I, PAUL CASAMAJOR, of the city of Brooklyn, county of Kings, State of New York, have invented a new and useful Improvement in the Treatment of Cinchona-Barks, which improvement is fully set forth in the following specification.

This invention has reference to the treatment of cinchona or Peruvian barks for the extraction of their medicinal principles, and has for its object the more complete removal of the valuable constituents of such barks than is attainable by the methods of treatment now in vogue.

According to this invention the bark is treated first with an alkali, and after standing some time is washed in a percolator or successive quantities of water added, the clear solution then being separated from the solid particles. This solution contains the acid constituents of the bark. The bark is then treated in like manner with an acid to remove the alkaloids, and the two solutions are mixed together, whereby the acid and alkali used in the treatment combine to form a soluble salt, while the natural acid and alkaline principles combine and form a precipitate.

It is immaterial for the purposes of the invention whether the bark is treated first with the alkali and then with the acid, or vice versa. Instead of mixing the two solutions together, the acids and alkaloids could be precipitated separately and then mixed. In either case the product contains both the alkaloids and the natural acids of the bark, and is the same in its properties and medicinal effect whether the said alkaloids and acids exist therein as a compound or as a mixture.

In order that my invention may be fully understood by those skilled in the art to which it appertains, I will describe more in detail the manner in which the same is or may be carried into effect.

I take a suitable quantity of ground cinchona-bark and add thereto just sufficient water to make a moderately thin paste. To this paste I add gradually an alkali or alkaline carbonate (preferably ammonia hydrate or carbonate of soda) in such quantity that the mixture becomes distinctly alkaline. After allowing the mixture to stand for, say, a quarter or half an hour, it is again tested, and if not sufficiently alkaline more alkali is added. After this the mixture is thrown on a filter or percolator and washed continuously until the liquid that passes through clear is no longer distinctly bitter; or, instead of this treatment, a quantity of water may be added to the alkaline mixture or paste, and after sufficient stirring the solid particles may be allowed to settle and the clear supernatant solution poured off and filtered clear. More water is then poured on the paste, and the same operation repeated until the ground bark is sufficiently exhausted. The solution thus obtained contains the acid constituents of the bark combined with ammonia, potassa, or soda, according to the alkali used. This solution is put aside for further use. The ground bark which has thus been freed from its acid constituents is now treated with dilute acid (say sulphuric or hydrochloric acid) until the proportion of acid be such that the mixture or paste remains distinctly acid. This mixture is now thrown on a filter or a percolator and washed until the clear solution passing through no longer shows decided bitterness. The solutions from the acid treatment are also put aside for future use. The filtration of these acid solutions is easy and rapid, so that there is no necessity to resort to decantation.

Instead of treating the bark first by an alkali and then by an acid, the reverse process could be followed—*i. e.*, treating first with an acid and then with an alkali—with equally good results. Furthermore, after the double treatment as described, the bark could be treated again in the same manner if the first treatment has not entirely removed the active principles. The next step is to mix together the two solutions—that is, that resulting from the alkaline treatment with that resulting from the acid treatment. On being mixed a double decomposition takes place, by which the acid and alkali employed for the extraction form a soluble salt, while the natural acid principles of the bark combine with the natural alkaloids, forming a precipitate. This precipitate is separated from the solution by filtration or decantation and is afterward dried for use.

Before mixing the two liquids from the alkaline and acid treatments it is preferred to bring each solution to the point of neutrality by adding very gradually an acid to the alkaline solution. When both solutions are brought to neutrality before mixing, the yield is increased.

Instead of proceeding exactly as just described, the new product indicated may be obtained by treating separately each of the solutions to produce a precipitate, the products of the two solutions being then mixed together. In proceeding in this manner the alkaline solution is treated with a slight excess of acid (such as hydrochloric acid) to precipitate the acid constituents, and the acid solution is treated with a slight excess of an alkali (such as ammonia) so as to precipitate the alkaloids. The two precipitates are then thoroughly mixed, the result being a product containing both the acid and alkaloid constituents of the bark.

I do not, however, specifically claim herein the modification of my process just described, having been required to make the same the subject-matter of a separate application, which I have accordingly filed on the 23d day of September, 1887, said application being numbered 250,490. To the said application are reserved all matters described and not claimed herein.

The precipitate obtained as above I call the "total extract" of the bark, as the treatment above described has separated the acids and alkaloids, which are its medicinal constituents. This total extract is slightly soluble in water, so that a certain portion escapes with the saline liquid obtained by filtering the precipitate. A great portion of this extract may be recovered by evaporating the filtered liquid.

I am aware that cinchona-barks have been treated by alkaline solutions for the removal of the acids, so as to facilitate the subsequent treatment by mineral acids to remove the alkaloids of the bark, and I am also aware that barks have been treated with diluted acids to separate the alkaloids; but by my process I produce a precipitate containing in combination the acid constituents of the bark and its natural alkaloids. The yield of this product is very great compared with that of the salts of the alkaloids as usually obtained, and the new product is superior to such salts as a tonic and febrifuge.

I claim—

1. The process of extracting the medicinal properties from cinchona-bark by treating the ground bark separately with an acid and with an alkali, mixing the solutions obtained from such treatments, and finally separating the resulting precipitate from the liquid, substantially as described.

2. The process of preparing cinchona or Peruvian bark for medicinal use by treating the bark with an alkali to remove the acid constituents, separating the bark from the solution and treating it with an acid to remove the alkaline constituents, bringing both acid and alkaline solutions to neutrality, mixing the two solutions together, and separating the precipitate resulting therefrom, substantially as described.

3. As a new manufacture, the precipitate of cinchona or Peruvian bark, containing both the natural acids and the alkaloids of such bark, substantially as described.

In testimony whereof I have signed this specification in the presence of two subscribing witnesses.

PAUL CASAMAJOR.

Witnesses:
   ALBERT P. DAWSON,
   BENJ. T. ROGERS.